United States Patent Office 3,242,143
Patented Mar. 22, 1966

3,242,143
SOLID POLYMERS OF ACETYL TRIALLYL CITRATE AND PROCESS FOR PRODUCING SAME
Peter J. Borchert, Elkhart, Ind., assignor to Miles Laboratories, Inc., Elkhart, Ind., a corporation of Indiana
No Drawing. Filed Apr. 26, 1962, Ser. No. 190,255
8 Claims. (Cl. 260—78.4)

This invention relates to solid polymers of acetyl triallyl citrate and to a proces for preparing such polymers. More particularly, the invention relates to a process for the polymerization of acetyl triallyl citrate to produce solid fusible polymers capable of further polymerization to form thermosetting resins.

It is known that the acetyl triallyl citrate monomer, a trifunctional compound containing three allyl groups ($CH_2$=CH—$CH_2$—) can be polymerized in the absence of solvents or other diluents to produce solid, infusible, thermosetting polymers. Such a procedure is described in patent application Serial No. 617,229, now abandoned, copending herewith and assigned to the instant assignee. The acetyl triallyl citrate polymers of this process, however, are unsatisfactory for certain industrial applications, such as molding and sheet casting, in that they will shrink substantially upon final polymerization to produce undesirable fractures in the product. Shrinkage of these polymers has been found to be from about 10% to 12%.

In accordance with another prior art process, as described in my copending application, U.S. Serial No. 71,449, filed November 5, 1960, which issued on June 25, 1963, as U.S. Patent No. 3,095,444, the acetyl triallyl citrate monomer in the presence of hydrogen peroxide can be prepolymerized in bulk, that is, polymerized to the point just before reaching the gel stage. The desired degree of polymerization may be estimated by periodically measuring the refractive index of the prepolymerization mixture. The resulting prepolymeric composition consists of a mixture of unreacted monomer and prepolymerized acetyl triallyl citrate of an extremely low molecular weight, which can be further polymerized to a thermosetting resin. Upon final polymerization, however, the prepolymer of this process will shrink as much as 8% or more.

Still another method for preparing polymers of acetyl triallyl citrate involves polymerizing the monomer in organic solvents, such as methanol, ethanol, isopropanol, n-butanol and the like in the presence of organic peroxides as catalysts. In this process there will precipitate solid polymers which are insoluble or only partially soluble in common organic solvents. In this same type of polymerization, the use of glycol monoethers, such as monomethylglycol ether, monoethylglycol ether and monobutylglycol ether; glycol diethers, such as dimethylglycol ether, diethylglycol ether and dibutylglycol ether; and ketones, such as acetone and methyl ethyl ketone, as polymerization solvents will give viscous resin solutions. Solid polymers of acetyl triallyl citrate cannot be separated from such solutions by conventional procedures, for example, precipitation with lower alcohols.

Generally speaking, it has not been possible heretofore to obtain a solid polymer of acetyl triallyl citrate which is characterized by fusibility and solubility in certain organic solvents, and which is capable of further polymerization to a thermosetting resin having such desirable properties as good dimensional stability, minimum shrinkage and resistance to deterioration by organic solvents.

Accordingly, a primary object of this invention is to provide a solid fusible polymer of acetyl triallyl citrate containing a plurality of polymerizable allyl groups ($CH_2$=CH—$CH_2$—) per molecule.

Another object is to provide a solid fusible polymer of acetyl triallyl citrate having a substantially linear structure.

Still another object is to provide a solid polymer of acetyl triallyl citrate which is soluble in certain organic solvents, such as esters, ethers, ketones, chlorinated hydrocarbons and aromatic hydrocarbons.

Yet another object is to provide a solid polymer of acetyl triallyl citrate capable of further polymerization to a thermosetting resin having good dimensional stability which is insoluble in water and certain organic solvents, such as aliphatic hydrocarbons and lower alcohols.

A further object is to provide a solid, fusible polymer of acetyl triallyl citrate which is subject to a minimum amount of shrinkage upon polymerization to a thermosetting resin.

Other objects and advantages of this invention are set out in the detailed disclosure and description which follows:

In accordance with the practice of the present invention, I have found that aromatic hydrocarbons, particularly certain homologs and analogs of benzene, provide the most suitable medium for solvent polymerization of acetyl triallyl citrate. Specifically, I have found that the acetyl triallyl citrate monomer can be conveniently polymerized in the presence of aromatic hydrocarbon solvents such as toluene, ethylbenzene, xylenes, bromobenzene, and the like, using organic peroxides as free radical initiators, to produce a solid, fusible polymer capable of undergoing further polymerization to a thermosetting resin having the desired chemical and physical properties mentioned previously.

In a prior art procedure for the solvent polymerization of styrene, described by F. R. Mayo in J. Am. Chem. Soc. 63, 2324–9 (1943), the author states that the degree of polymerization, as determined by the average number of molecules per polymer unit, will vary significantly with the particular solvent used. According to Mayo, the tendency of the solvent to interfere with polymerization is due to a property of the solvent which he designates as the "transfer constant," that is, the ability of the solvent to combine with the free radical of the polymerizable material and thus terminate the reaction at a given point. Benzene, for example, is cited as a solvent having a low transfer constant, which will exhibit only a slight tendency to interfere with a chain reaction polymerization. The author also notes that in polymerization reactions utilizing a solvent having a low transfer constant, the concentration of the catalyst employed has a significant effect on the reaction; conversely, the concentration of the catalyst is much less important in a polymerization reaction employing a solvent having a high transfer constant.

In the process of this invention, toluene and the xylenes, which have transfer constants lying in a medium range, have been found to be particularly effective as polymerization solvents, with toluene being the preferred solvent. The polymerization of acetyl triallyl citrate may be conveniently controlled with the use of toluene because of the fact that this compound, which has a transfer constant in the medium range, will tend to interfere with the reaction. In this manner, the reaction can be terminated at any given point.

The acetyl triallyl citrate monomer to be used in the process of this invention may conveniently be prepared by esterifying citric acid with allyl alcohol in the presence of an acidic catalyst, such as sulfuric acid or p-toluene sulfonic acid. Water produced in the reaction may be removed azeotropically with toluene or benzene. After the theoretical amount of water has been isolated the azeotropic solvent is stripped off under vacuum. The crude triallyl citrate is then acetylated with acetic anhydride in the presence of an acidic catalyst, such as those employed in the esterification step. Acetic acid resulting from the acetylation is removed under vacuum. The acidic catalyst is then neutralized to yield crude acetyl triallyl citrate monomer, which, without further purification, can be polymerized to a solid, fusible polymer capable of further polymerization to a thermosetting resin.

In the absence of an inhibitor the acetyl triallyl citrate monomer will undergo polymerization when stored for extended periods of time. Any of the well known polymerization inhibitors, when added to the monomer in small amounts, will effectively arrest this polymerization. For example, hydroquinone or t-butyl catechol may be used for this purpose.

In accordance with the practice of this invention, I have found that polymerization of the acetyl triallyl citrate monomer after a period of storage can be accomplished without resorting to the cumbersome procedure of removing the inhibitor.

The polymerization reaction is conducted with toluene as the polymerization solvent in the presence of an oxygen-yielding catalyst, such as an organic peroxide. Preferred catalysts are benzoyl peroxide or t-butyl perbenzoic acid. A desirable concentration of the monomer in the solvent is found to be about between 20% and 40% of the monomer by weight of the solvent. The preferred catalyst is t-butyl perbenzoic acid, used in a concentration of about from 4% to 6% by weight of the monomer. Other oxygen-yielding catalysts which may be used as initiators are acetyl peroxide, lauroyl peroxide, benzoyl acetyl peroxide, dibutyl peroxide, t-butyl hydroperoxide, peracetic acid, perphthalic acid, and the like.

The polymerization reaction is generally found to be completed in about from 3 hours to 10 hours at reaction temperatures about between 95° C. and 115° C. A preferred reaction temperature is in the range of 100° C. to 105° C., with the preferred reaction time being about from 3 hours to 5 hours.

The composition resulting from the polymerization reaction comprises a viscous, syrupy mixture containing unreacted monomer and solid polymer dissolved in the polymerization solvent. The polymer is insoluble in lower aliphatic alcohols while the monomer is known to be soluble in such compounds. Thus the polymer can be effectively separated from the mixture by precipitation with a low boiling alcohol, such as methanol, ethanol, or isopropanol. The precipitate may be collected by filtration and dried in an oven at temperatures of about between 30° C. and 50° C. to evaporate the alcohol solvent. The polymer in the form of a fine, white powder, which melts at about 100° C. to 150° C., is obtained in yields of from 50% to 75%.

The solid, fusible polymer of this invention, which has a substantially linear structure and which contains a plurality of polymerizable allyl groups per molecule, may be represented by the following formula:

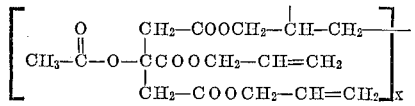

wherein $x$ represents an integer of about from 4 to 14.

Because of its solubility in certain organic solvents, such as esters, ethers, ketones, chlorinated hydrocarbons and aromatic hydrocarbons the polymeric compositions of this invention can be used to impregnate materials such as paper and fiber in the production of laminates.

With the application of heat and pressure, the solid fusible polymeric composition will undergo further polymerization to a thermosetting resin which has an extremely high surface hardness and is resistant to deterioration from water, certain organic solvents, such as those mentioned above in which the polymer is soluble, and alkalis, such as aqueous sodium hydroxide.

Still another commercial application of the novel polymers of this invention is in the production of transparent films which have good flexibility, excellent surface durability and which will adhere well to various surfaces, in particular to metal surfaces. Because of these properties, the films are useful as protective coatings for metal objects.

Such films can be derived from solutions of the polymer in certain organic solvents, such as those mentioned previously, by evaporating the solvent and heating the polymeric material to temperatures from 10° C. to 20° C. above the softening range. Another procedure for preparing the films, comprises adding a polymerization catalyst to the polymeric solution and heating the material for about from 30 minutes to 120 minutes at temperatures between about 100° C. and 120° C. The preferred catalyst is t-butyl perbenzoic acid used in an amount of about 1% to 5% by weight of the polymer.

The following example illustrates polymerization of acetyl triallyl citrate monomer in the presence of an inhibitor to obtain a solid, fusible polymer which is further polymerized to a thermosetting resin:

EXAMPLE I

Preparation of polymer

A mixture of 120 parts by weight of acetyl triallyl citrate monomer containing 0.001% hydroquinone and 3 parts by weight of t-butyl perbenzoic acid, was dissolved in 200 parts by weight of toluene. The mixture was heated under reflux, with stirring, for 1 hour at 114° C. To this mixture was added 2 parts by weight of t-butyl perbenzoic acid and heating was continued for 2 more hours. After cooling to a temperature of 30° C., the mixture was poured slowly and with stirring into 12,000 ml. of methanol to give a white precipitate. The precipitate was collected by filtration, washed with fresh methanol and dried in an oven at 50° C. to evaporate the solvent.

The polymer in the form of a fine, white powder, softening at between 105° C. and 120° C., was soluble in acetone, butyl acetate and aromatic hydrocarbons, such as benzene, toluene and xylenes and it was insoluble in water, heptane and lower alcohols, such as methanol, ethanol and isopropanol. Yield: 76 parts by weight (63% of theory). The polymer is further characterized as having an average molecular weight of 3000 (Rast), which represents a degree of polymerization of 8.4. Infrared spectra indicate that the structure of the polymer is substantially linear. Residual unsaturation was determined to be 45%. Intrinsic viscosity was 0.81 per gram in acetophenone. Shrinkage of the polymer, upon polymerization to a thermosetting resin was determined to be less than 1.5%.

Preparation of thermosetting resins

A. MOLDINGS

In a typical molding composition, 66 parts by weight of the solid polymer was dissolved in 200 parts by weight of acetone. To the solution was added 2.6 parts by weight butyl perbenzoate, as a catalyst; 7.4 parts by weight zinc stearate, as a mold release agent; and 24 parts by weight titanium dioxide (Unitane OR–540) as a filler. After evaporation of the acetone in an oven the dried material was reduced to a powder by grinding overnight in a ball mill. The powder composition was then subjected to a mold at temperatures ranging from 260° C. to 325° C., for from 15 minutes to 40 minutes, at a pressure of from 1500 p.s.i. to 2000 p.s.i.

Molded discs prepared according to the above procedure had an extremely high surface hardness and were insoluble in water and aromatic hydrocarbons such as benzene, toluene and xylenes, and in alkalis such as aqueous sodium hydroxide. There were no fractures in any of the discs.

B. FILMS

Ten grams (10 g.) of the solid polymer were dissolved in a mixture of 20 g. of acetone and 10 g. of toluene. A flat metal strip was immersed in the solution until thoroughly coated. The solvent was allowed to evaporate at room temperature and the strip was dried in an oven at 160° C. for 30 minutes to effect further polymerization of the fusible polymer to a thermosetting resin.

The resulting surface coating had excellent surface durability, good flexibility and was insoluble in water; aromatic hydrocarbons, such as benzene, toluene and xylenes, and alkalis, such as aqueous sodium hydroxide.

EXAMPLE II

A mixture of 400 parts by weight of acetyl triallyl citrate monomer and 16 parts by weight of tertiary butyl perbenzoic acid was dissolved, with stirring, in 1000 parts by weight of toluene, refluxing at 112° C., to initiate polymerization. Polymerization was halted after 9 hours by allowing the mixture to cool to 50° C. A portion of the toluene, 650 parts by weight, was then stripped off under vacuum and recovered. Isopropanol was then added until the clear, viscous liquid became turbid. The liquid mixture was then poured, with stirring, into 1 gallon of isopropanol and a fine, fluffy white material precipitated from solution. The precipitate was collected by filtration, washed with isopropanol and dried at 50° C., to evaporate the solvent.

The polymer in the form of a fine, white powder, softening at between 120° C. and 130° C., had the same solubility properties as the polymer of Example I. Yield: 240 parts by weight (60% of theory).

EXAMPLE III 240 grams of t-butyl perbenzoic acid were dissolved in 10 kilograms of toluene, followed by addition of 4 kilograms of acetyl triallyl citrate monomer. The resulting mixture was heated in a reactor for 5 hours at temperatures between 98° C. and 100° C. The mixture was then allowed to cool to a temperature between 60° C. and 70° C. and 5 kilograms of toluene were stripped off under a vacuum of between 20 and 30 mm. To the viscous mixture were added, slowly and with stirring, 2 gallons of methanol. The entire liquid mixture was then poured slowly and with vigorous stirring into 20 gallons of methanol to precipitate the polymer as a white, solid material. The precipitate was collected by filtration, washed with 1 gallon of methanol and dried overnight at 27° C. to evaporate the solvent.

The polymer in the form of a fine white powder, softening at between 140° C. and 150° C., had the same solubility properties as the polymer of Example I. Yield: 2.050 kg. (51% of theory).

In summary, the present invention provides solid, fusible polymers of acetyl triallyl citrate and a process for obtaining such polymers, which are capable of further polymerization to thermosetting resins. These thermosetting resins have utility in a variety of commercial applications, such as molding, protective coatings, and the production of laminated materials. The novel polymers of this invention are obtained by polymerization of the acetyl triallyl citrate monomer in an aromatic solvent which has a "transfer constant" in the medium range, in the presence of an organic peroxide as a catalyst. The preferred solvent is toluene and the preferred catalyst is t-butyl perbenzoic acid.

What is claimed is:

1. A process for preparing a solid, fusible homo-polymer of acetyl triallyl citrate which comprises polymerizing acetyl triallyl citrate monomer in an aromatic solvent selected from the class consisting of toluene, ethylbenzene, xylenes and bromobenzene, in the presence of an organic peroxide, at a temperature of about from 95° C. to 115° C. for about from 3 hours to 10 hours.

2. A process according to claim 1 wherein the organic peroxide is a member selected from the group consisting of t-butyl perbenzoic acid and benzoyl peroxide.

3. A process for preparing a solid, fusible homo-polymer of acetyl triallyl citrate which comprises polymerizing acetyl triallyl citrate monomer in an aromatic solvent selected from the class consisting of toluene, ethylbenzene, xylenes and bromobenzene, wherein the concentration of said monomer in said solvent is about between 20% and 40% by weight of the solvent, in the presence of an organic peroxide present in a concentration of about from 4% to 6% by weight of said monomer, at a temperature of about from 100° C. to 105° C., for about from 3 hours to 5 hours.

4. A process according to claim 3 wherein the aromatic solvent is toluene.

5. A process according to claim 3 wherein the organic peroxide is t-butyl perbenzoic acid.

6. A process according to claim 3 wherein the solid, fusible polymer is precipitated from the reaction mixture with a lower aliphatic alcohol selected from the group consisting of methanol, ethanol and isopropanol.

7. A process according to claim 6 wherein the lower aliphatic alcohol is methanol.

8. A solid, fusible homo-polymer of acetyl triallyl citrate having a substantially linear structure and having the formula

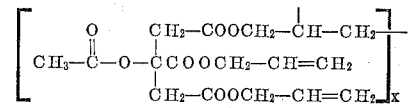

wherein $x$ represents an integer of about from 4 to 14.

References Cited by the Examiner
UNITED STATES PATENTS

| | | | |
|---|---|---|---|
| 2,155,590 | 4/1939 | Garvey | 260—17 |
| 2,446,314 | 8/1948 | Wagers et al. | 260—78.4 |
| 2,545,184 | 3/1951 | Whitehill et al. | 260—78.3 |
| 2,962,488 | 11/1960 | Horne | 260—94.9 |
| 3,025,271 | 3/1962 | Borchert | 260—78.3 |

JOSEPH L. SCHOFER, *Primary Examiner.*

DONALD E. CZAJA, *Examiner.*